(No Model.) 6 Sheets—Sheet 4.

F. H. RICHARDS.
WEIGHING AND PACKING APPARATUS.

No. 589,301. Patented Aug. 31, 1897.

Witnesses
Chas. F. Schmelz
Fred. J. Dole

Inventor
F. H. Richards

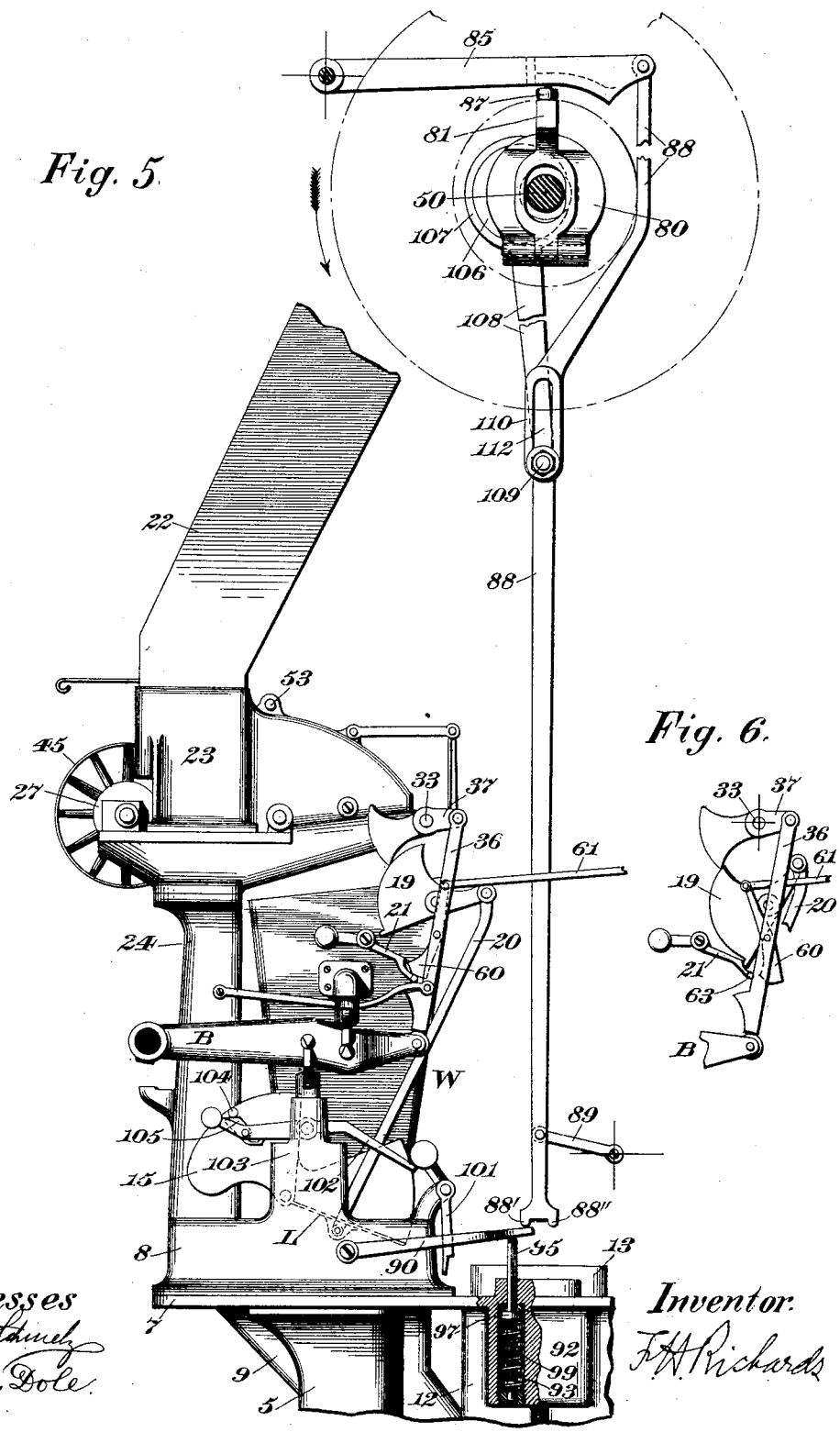

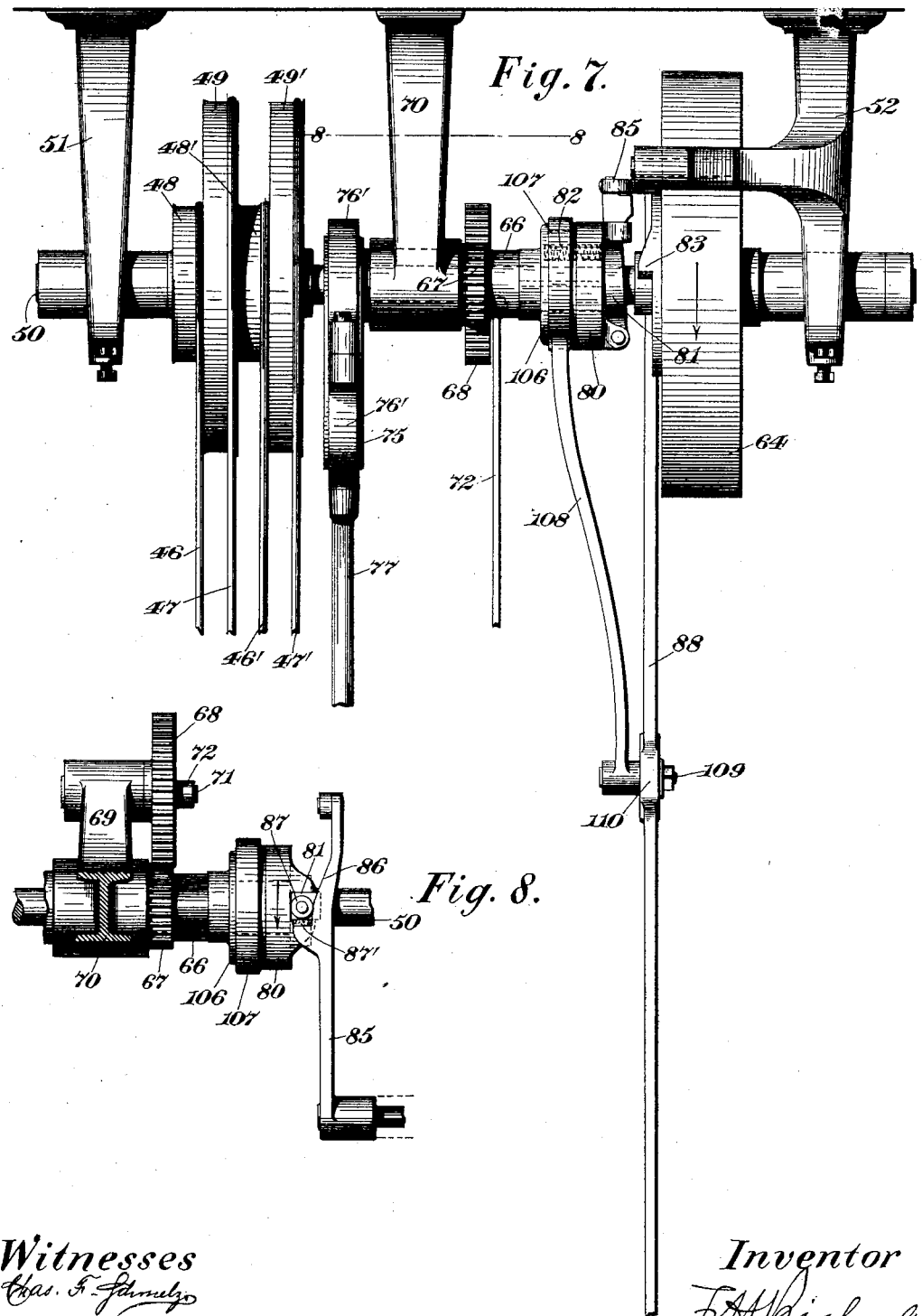

United States Patent Office.

FRANCIS H. RICHARDS, OF HARTFORD, CONNECTICUT.

WEIGHING AND PACKING APPARATUS.

SPECIFICATION forming part of Letters Patent No. 589,301, dated August 31, 1897.

Application filed October 7, 1896. Serial No. 608,139. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Packing Apparatus, of which the following is a specification.

This invention relates to weighing and packing apparatus; and the object of the invention is to provide an improved and efficient apparatus of this character for automatically weighing and delivering with facility predetermined charges of material to be conducted to suitable receptacles in which they are firmly and densely packed, instrumentalities being also employed for insuring the regular or sequential operation of the respective mechanisms, said apparatus being more especially adapted for weighing and packing various classes of foods, such as rolled oats, wheat, and similar substances.

Figure 1:
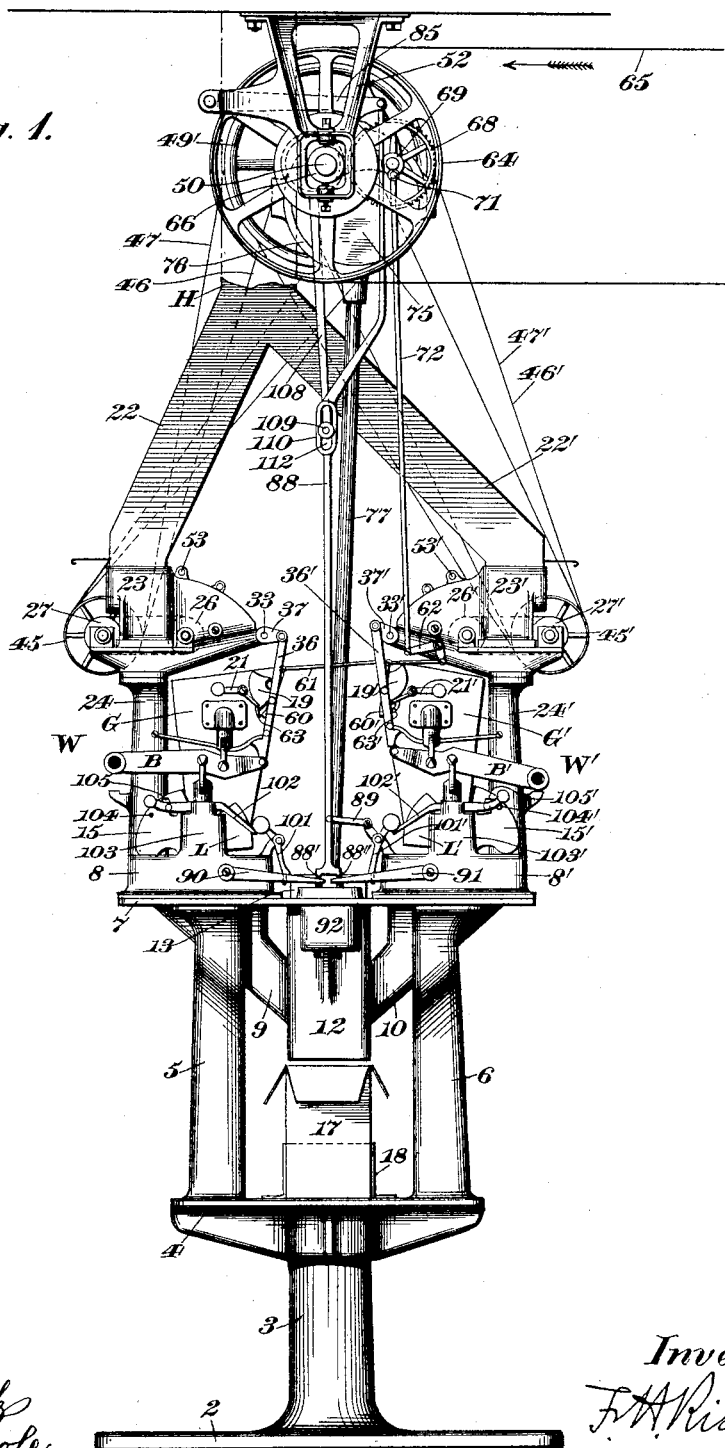
Figure 2:
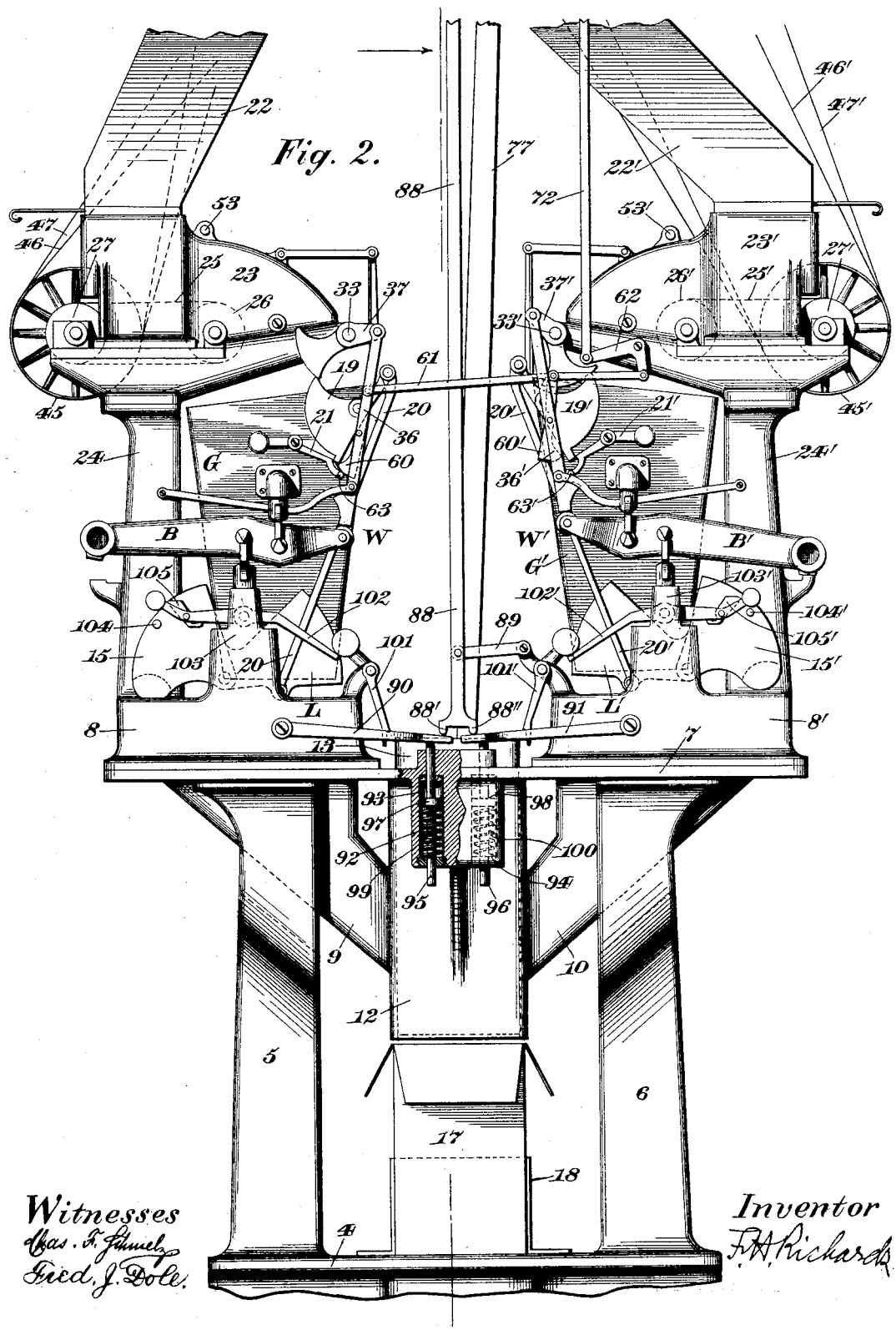
Figure 3:
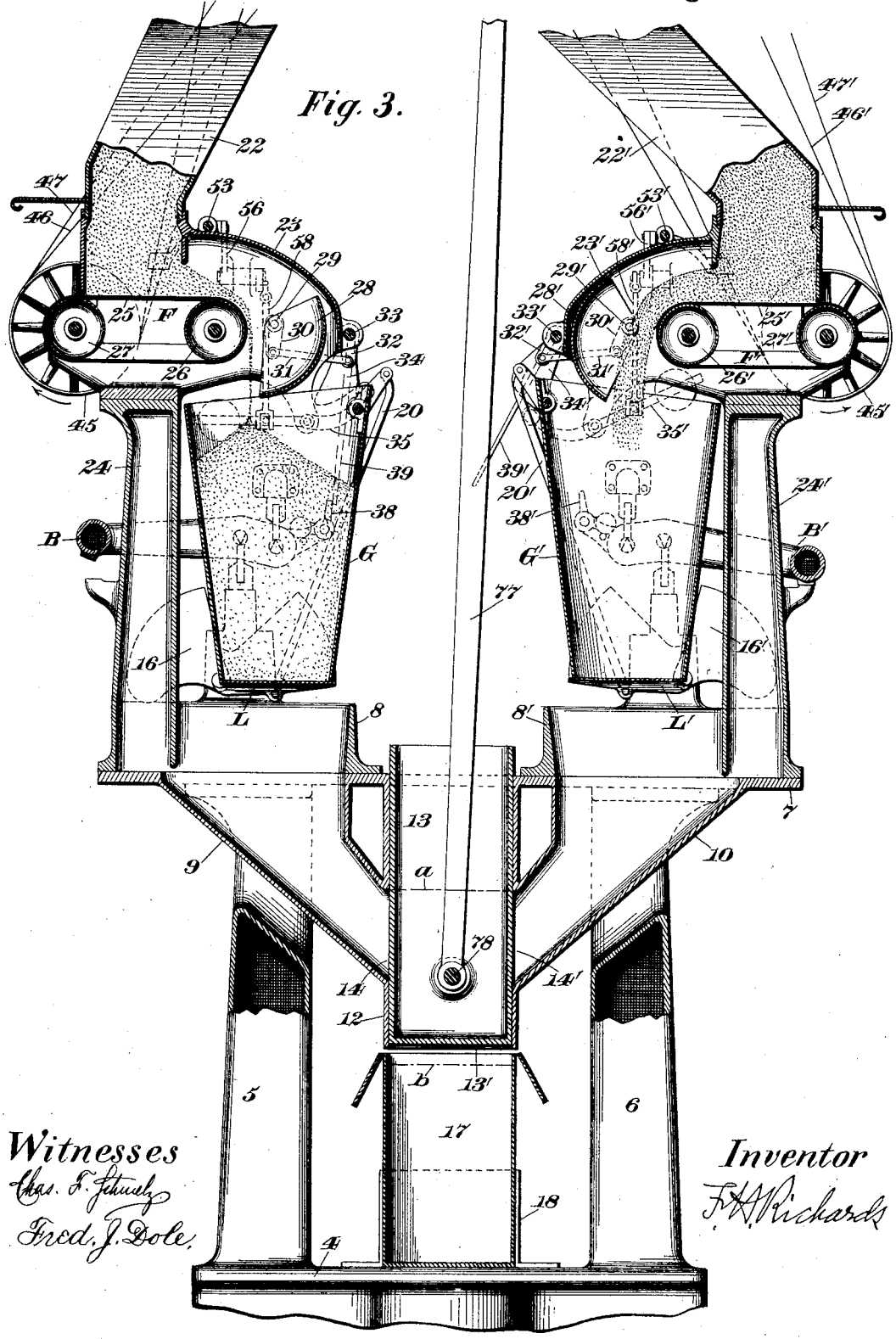
Figure 4:
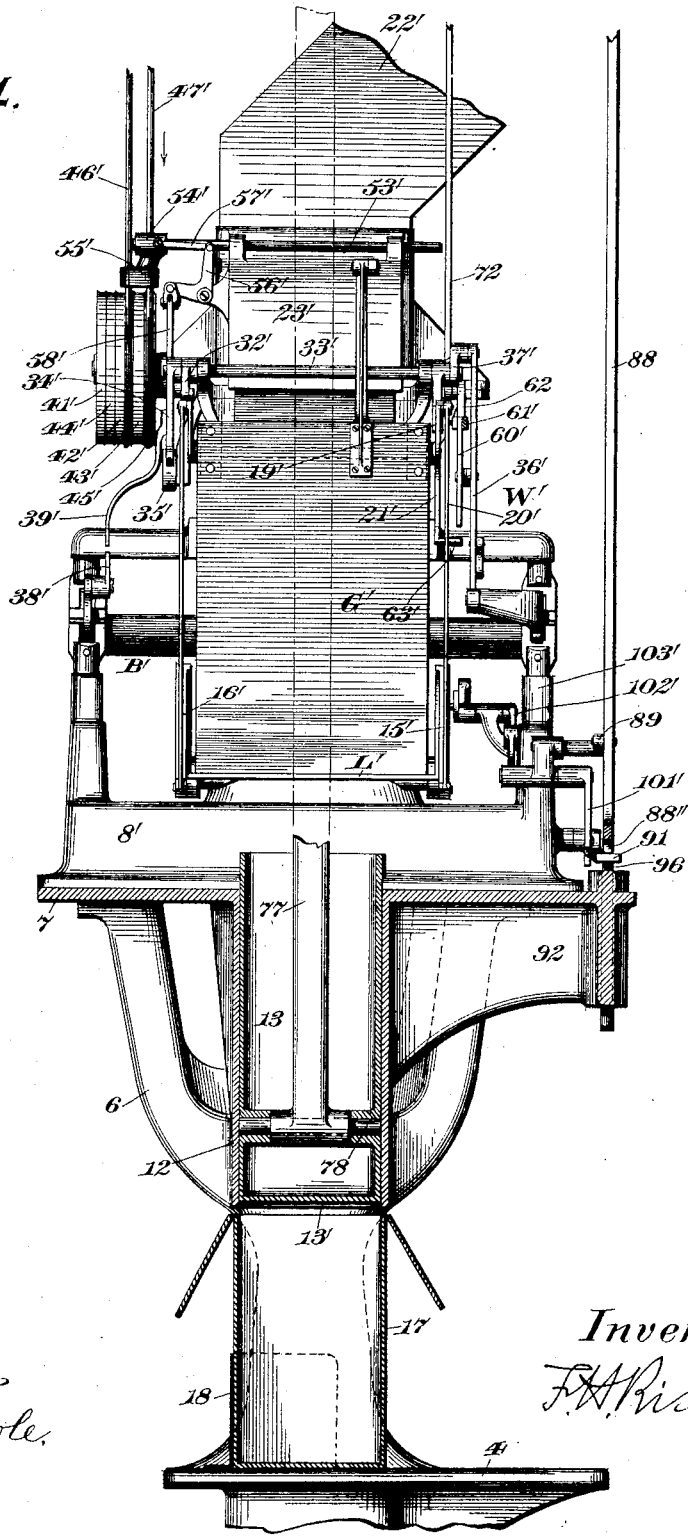

In the drawings accompanying and forming part of this specification, Figure 1 is an end elevation of the entire apparatus. Fig. 2 is a similar view of the lower part thereof on an enlarged scale, one of the load-receivers having nearly completed its load, the other being empty, and the portion of the framing being removed to illustrate the coöperative relation of the plunger-controlling and weighing mechanisms. Fig. 3 is a vertical central section of Fig. 2, a portion of the supply spouts or conduits for the weighing mechanisms being in elevation and the load-receivers being in positions corresponding with Fig. 2 and the packing-plunger being in its normal position. Fig. 4 is an inside face view of one of the weighing mechanisms and adjacent parts, showing the plunger-casing, the plunger, and a charge-containing receptacle in transverse central section. Fig. 5 is an end elevation of one of the weighing mechanisms and a part of the plunger-controlling mechanism. Fig. 6 is a detail view of a portion of the load-discharge-controlling means for one of the weighing mechanisms, a tripper for the latch, which constitutes a part of said means, being illustrated in its inoperative position. Fig. 7 is a detail view of a power-shaft and the various driving and controlling mechanisms supported thereby; and Fig. 8 is a detail in sectional plan view, taken in the line 8 8, Fig. 7, and shows a method of holding the plunger-actuating mechanism out of action or at rest.

Similar characters designate like parts in all the figures of the drawings.

The apparatus in the construction thereof illustrated in the appended drawings includes as a constituent or coördinate part thereof weighing mechanism which may be of any suitable or preferred type, and for the purpose of increasing the output of the apparatus I prefer to employ a plurality or multiplicity of weighing mechanisms. Said weighing mechanisms, of which I show a pair, are independently operative, the load-receivers thereof being alternately or successively dischargeable.

A base or bed plate is shown at 2, from which rises a post or standard 3, which fits tightly within a reinforced socket on the under face of the platen or receptacle support 4. A pair of U-shaped standards are shown at 5 and 6 mounted on the platen 4 at opposite sides thereof, they being surmounted by the shelf or platform 7, which serves as a convenient support for the bases 8 and 8' of the two weighing mechanisms, said bases being preferably removably attached to said platform by suitable means. (Not shown.)

The bases 8 and 8' are in the form of open hoppers, their openings registering with the inlet or supply openings of the two load-conducting chutes 9 and 10, said chutes communicating with the casing 12, which in the present instance is rectangular. The packing device or plunger 13, which is of tubular form and has a closed bottom, is reciprocative within the casing 12 and frictionally engages the inside face of said casing to prevent material working between its outside face and the adjacent face of said casing, said plunger being adapted, when in its normal or middle position, to cover or close the inlet or supply openings 14 and 14', formed in the opposite walls of the casing, whereby it serves also the purpose of a valve. When said plunger is elevated to uncover the inlet-openings 14 and 14', or when its under flat or packing face reaches the position indicated by the dotted line *a*, Fig. 3, a charge of material in either one of the two chutes 9 and 10 may pass through one or the other of said inlet-openings, as the case may be, and into the casing 12, from whence it will gravitate into a suitable containing-case intended for its reception.

As the weighing mechanisms, which are designated in a general way by W and W', are the same in each case, a specific description of one will suffice for both, corresponding parts in the other mechanism being designated by similar characters with prime-marks.

The weighing mechanism W comprehends a scale-beam B and a load-receiver G.

The scale-beam B consists of a pair of substantially parallel arms pivotally supported by suitable bearings or posts rising from the base 8, at opposite sides thereof, and a counterweight joining said arms, said beam-arms being also furnished with suitable supports for sustaining the bucket G, as is usual.

The load-receiver or bucket G has at its lower end the ordinary discharge-outlet, which is regulated by the closer L, said closer consisting of an approximately flat plate adapted to fit tightly against the lower edge of the bucket when in its normal or shut position, as illustrated best in Fig. 3. The closer is pivotally connected to the bucket and is also furnished with the preferably integral and counterweighted end plates 15 and 16, the office of which is to return it to its shut position on the discharge of a load by the bucket.

It will be understood that when such last-mentioned operation takes place the bucket contents from the load-receiver G will gravitate into the chute 9, having first passed through the hopper 8 until they reach the plunger 13, which is then in its normal position and acts as a valve. On the elevation of the plunger 13 in the manner hereinbefore specified the bucket load or charge may pass into the plunger-casing 12 through the inlet-opening 14, and from thence will gravitate into a suitable containing receptacle or case.

I have shown a charge-containing receptacle at 17, it consisting of a box disposed within a gage-plate 18 in vertical alinement with the plunger-casing 12, said gage-plate being suitably joined to the platen 4.

The following means may be employed for maintaining the closer L in its normal or shut position: A rocker is shown at 19 pivotally mounted on the bucket G, it having pivoted to an arm thereof the relatively long connecting-rod 20, which latter is similarly attached to the closer L about midway thereof. A counterweighted closer-latch is shown at 21 pivoted to the bucket G and adapted to engage a shoulder on the rocker 19 when the closer is shut, said latch swinging upward for this purpose.

A supply-pipe is illustrated at H, it having the branch pipes or conduits 22 and 22', which lead to the two weighing mechanisms W and W' for supplying the same with material, the respective supplies, however, being received by force or power feeders and by them delivered into the two buckets G and G', said supply pipe or conduit H communicating with a suitable source of supply, such as a bin or hopper. (Not shown.)

For maintaining an even uniform supply of material to the respective buckets G and G', I prefer to employ force-feed devices or feeders, which are designated by F and F' and are supported for movement within the housings or hoods 23 and 23', which are mounted on the posts 24 and 24' rising from the bases 8 and 8'. The two feeders and their driving and controlling mechanisms being the same, a description of one of such organizations will suffice for both, corresponding parts in the other being designated by similar characters with prime-marks.

The feeder F consists of an endless feed belt or apron 25 passed around the supporting rolls or drums 26 and 27, (see Fig. 3,) the shafts of said rolls being journaled in suitable bearings formed in the opposite members of the housing 23.

The two feeders F and F' will preferably have differential speeds, they subsequently being thrown out of action or stopped. At the commencement of operation they will have their maximum velocity for conveying to the buckets from the supply-pipes 22 and 22' relatively large volumes of material to form the major part of the loads or charges to be made up. At the commencement of the poising period the speeds of the two feeders will be materially reduced, whereby they are capable of delivering attenuated or reduced supplies to the two buckets for the purpose of completing or topping off the partial loads therein. On the completion of the bucket-loads the feeders will be stopped, and on the stoppage of such feeders I prefer to project valves across the lines of feed to catch any particles which may drop from said feeders, as such particles do not form a part of the bucket-loads.

Referring now to Fig. 3 and to the weighing mechanism W and its appurtenances, a drizzle-catching valve is shown at 28 supported for oscillation by the shaft 29, said shaft being suspended between the walls of the housing 23 and having an arm 30, which is connected by the link 31 to the arm 32 extending from the rock-shaft 33, said last-mentioned shaft being sustained by ears or lugs on the housing 23. As the bucket descends the valve 28 will be slowly moved toward the line of feed of the supply-stream, though it does not, during the making of a load, come in contact with the mass of material.

As indicated in Fig. 3, the valve 28 has nearly reached the end of its closing movement, at which time it is momentarily intercepted to permit the supply of the attenuated or drip stream to the bucket, and when the load is completed said valve will be released and will be given its final closing movement, concurrently with which the feeder F will be stopped, said valve on said action catching the dropping particles from said feeder.

For closing the valve or moving it toward the line of feed of the supply-stream I have illustrated mechanism somewhat similar to that disclosed in Letters Patent No. 548,840, granted to me October 29, 1895, to which reference may be had and which will now be briefly described. The rock-shaft 33 is furnished with a depending rigid cam 34, which is adapted to be engaged and operated by the counterweighted lever 35, said lever being fulcrumed to an arm on the housing 23 and being also furnished with an antifriction-roll which is adapted to travel in contact with the working face of the cam 34. At the commencement of operation when the valve 28 is in its wide-open position the lever 35 will be in a position corresponding to the lever 35', (see Fig. 3,) the feeder F at this time being driven at its highest velocity, so that a stream of material of large volume may be conducted to the bucket G.

When a certain part of the load has been received by the bucket, it and the beam B will descend, and in so doing the weighted arm of the lever 35 is permitted to drop vertically, whereby the cam 34 may be oscillated to the left by said lever and the valve 28, by reason of the interposed connections, be swung in a corresponding direction, the movement of these parts being limited by the scale-beam B, which engages the free end of a rod 36, which is pivoted to the crank-arm 37 on the rock-shaft 33. At the commencement of the poising period a by-pass, such as 38 on the beam B, will arrest the movement of the depending rod 39 on the rock-shaft 33, so that the valve is held, as will be understood. When the beam B has reached the end of its downstroke, the by-pass 38 thereof will release the rod 39 and also the valve 28, so that the latter may be given its final closing movement for accomplishing the hereinbefore-described results. On the discharge of the bucket-load the beam B will rise, and in so doing will transmit an upward thrust to the rod or link 36, so that, by reason of the operative connections between said rod and valve, the latter may be swung open, as will be obvious.

For obtaining differential speeds of the feeder F at proper points in the operation of the weighing mechanism and for also throwing said feeder out of action on the completion of a bucket-load I prefer to employ means operative with and governed by said weighing mechanism, and which will now be described.

Referring now to Fig. 4, which shows the weighing mechanism W', the shaft of the roll 27' is furnished with a series of fast and loose pulleys, there being three loose and two tight pulleys on said shaft, the loose pulleys being designated by 41', 42', and 43' and the fast or tight pulleys by 44' and 45', the power-transmitting or driving belts or ropes 46' and 47', which are shiftable along said pulleys, being also passed around the small and large fast or tight pulleys 48' and 49', respectively.

The pulleys 48' and 49' are tight or fast on the power-shaft 50, the latter being supported by the hangers or yokes 51 and 52, which may be attached to the ceiling of a building or apartment in which the apparatus is used.

The driving-belt 47' being on the large tight pulley 49' and the fast pulley 45', and the belt 46' being on the small tight pulley 48' and on the loose pulley 43', as indicated in Figs. 4 and 7, the feeder F' will be driven at a high speed or velocity for conveying a stream of large volume to the bucket G'. On the shipment of the belt 47' to the loose pulley 43' and the slipping of the belt 46' from the loose pulley 43' to the fast pulley 44' the feeder F' will be driven through the medium of the small pulley 48', and consequently at much less velocity, the loose pulley 43' simply rotating idly about its shaft, and the simultaneous shipment of the two belts as thus specified will take place at the commencement of the poising period. At a subsequent point in the operation of the machine, or when the load has been completed in the receiver G, the belts 47' and 46' will be again and synchronously shipped, the driving-belt 47' simply being moved farther along the loose pulley 43', which has a relatively wide face, and the belt 46' being shipped from the fast pulley 44' to the loose pulley 41', so that both of said belts will then be on the loose pulleys 41' and 43', the latter, as will be clearly obvious, being idly rotated about their supporting-shaft. For thus shipping the two belts the following-described means operatively connected with the valve-actuating lever 35' are shown: A transversely-reciprocatory bar is shown at 53' passed through openings formed in lugs or ears on the housing 23', said bar having near its outer end a sleeve 54', to which is connected a belt-shipping arm having belt-engaging fingers or loops of ordinary construction between or through which the two belts are adapted to travel.

Fig. 4 represents the positions occupied by the belts and connected parts at the commencement of operation, and it will be evident that as the bar 53' is shifted or slid to the left the two belts will be shipped in the manner previously described for first reducing the speed of and then stopping the feeder F.

An angle-lever is shown at 56', the upright arm of which is connected by the link 57' to the sleeve or hub 54' of the belt-shipping device or arm 55', the other arm of said angle-lever being connected by the rod 58' to the valve-actuating lever 35' at a point intermediate its weight and fulcrum. As the weighted arm of said valve-actuated lever 35' drops the rod 58' will be drawn downward, the valve 28', of course, being simultaneously closed, and the hub 54' of the belt-shipping arm 55' will be moved to the left by virtue of the interposed link 57' and angle-lever 56'.

At the commencement of the poising period the belt 46' will be on the pulley 44', the belt 47' being on the loose pulley 43', the further closing movement of the valve 28' and the action of the lever 25' having been arrested by the by-pass 38' on the beam B', which engages the rod or arm 39' on the rock-shaft 33' in the manner disclosed by the weighing mechanism W, Fig. 3, and the feeder will be driven at a slow or reduced speed. On the completion of the bucket-load the by-pass will descend with the beam and will release said arm, and consequently the valve, whereby the latter will be given its final closing movement. During this period the belt 47' will be slipped farther along the loose pulley 43', and the belt 46' will be shipped from the fixed or tight pulley 44' to the loose pulley 41', thereby stopping the feeder F', as will be clearly understood.

From the foregoing description it will be understood that the apparatus includes a pair of weighing mechanisms, each embodying load-discharge-controlling means comprehending latches, and for the purpose of preventing the simultaneous discharge of the two load-receivers I provide latch-trippers which are alternately effective, each latch of course having a tripper, means being employed for simultaneously throwing said latch-trippers into their operative and inoperative positions, respectively.

The trippers for the two latches are designated by 60 and 60' and are in the form of cam-levers pivoted to the reciprocatory rods 36 and 36', said latch-trippers being also preferably directly connected, for example, by the transversely-reciprocatory shifting rod or link 61, which extends beyond the latch-tripper 60' and is pivoted to the vertical or upright arm of the angle-lever 62, mounted on the housing 23'. (See Figs. 1 and 2)

As the rod or link is intermittently reciprocated back and forth it will throw one of the latch-trippers into its effective plane of action and the other out of or beyond its effective plane of action, the instrumentalities for obtaining this result being preferably controlled or regulated by the plunger driving or actuating mechanism, as will hereinafter appear.

In Fig. 2 the latch-tripper 60 is shown in its operative or working position, the companion latch-tripper 60' being in its ineffective position, whereby on the downstroke of the member 36 in the manner previously described and during the weighing of a load said part 60 will be caused to impinge against a pin or stud 63 on the latch 21, and on the continuation of such action the latch will be tripped and disengaged from the shoulder on the rocker 19, thereby freeing said rocker and consequently the closer L, whereby the latter may be forced open by the weight of the contents within the bucket, which are discharged into the chute 9 and subsequently delivered to the packing mechanism.

The power-shaft 50 is provided with a driving wheel or pulley 64, suitably connected thereto and which may be connected by the belt 65 or otherwise to a convenient motor. (Not shown.) Said shaft 50 also carries a loose sleeve or hub 66, which is intermittently coupled thereto, whereby it constitutes in effect an integral part of said shaft when so coupled.

The loose sleeve 66 rigidly carries the pinion 67, which meshes with the gear 68, the ratio of efficiency of which is as one is to two, so that when the pinion 67 makes a complete rotation the meshing gear 68 will make but a half-turn. The gear 68 is fast on a stub-shaft which is mounted on the arm 69, extending from the hanger 70, the sleeve 66 passing through the lower hub-like end of said hanger.

The gear 68 is furnished with a crank or wrist pin 71, to which is loosely connected the pitman or rod 72, the latter being pivoted to the approximately horizontal arm of the angle-lever 62, which is supported by the horizontal arm of the housing 23'. The sleeve 66 makes but one revolution, as it is intermittingly coupled to the power-shaft 50, and it will be assumed that it has been coupled to said shaft, the latch-trippers 60 and 60' previous to this operation occupying the positions illustrated in Fig. 2, and the crank-pin 71, and hence the pitman 72, being at the limits of their downstrokes, as illustrated in Figs. 1 and 2. As soon as the sleeve 66 is coupled to the shaft 50 the pinion 67 will be caused to rotate in a direction corresponding to that of the power-wheel 64, the gear 68 being oppositely rotated, whereby on such movement of said gear the pitman 72 will be elevated and the connecting-rod 61 by means of the angle-lever 62 thrust to the left, whereby the latch-tripper 60 will be thrown to its inoperative position, as illustrated in the detail view Fig. 6, or beyond its path of effective action, the latch-tripper 60' being oppositely oscillated or thrown into action, as will be clearly understood.

When the sleeve 66 is uncoupled from the shaft 50, it makes but a single rotation, and the gear 68 will have made but half a turn. When the sleeve 66 is again coupled to its supporting-shaft, the pitman or connecting-rod 72 will be thrust downward, and the operation just described will be reversed, as will be understood.

The plunger actuating or driving mechanism includes an eccentric such as that illustrated at 75, said eccentric being rigidly or integrally joined to the loose sleeve or hub 66. The eccentric 75 is embraced by the two-part ring or strap 76', the sections of which are suitably connected and one of which has a suitable socket for receiving the connecting-rod 77, said connecting-rod having a suitable bored hub or enlargement at its lower end, through which passes the pin or spindle 78 of the plunger 13.

Figs. 1, 3, and 4 represent the plunger and eccentric 75 in their normal or mid-stroke positions. Let it be assumed that a charge of material has been delivered to the chute 9 by the load-receiver or bucket G and that the loose sleeve 66 has been coupled to the driving-shaft 50. When this last-mentioned action takes place, the eccentric 75 will be rotated in unison with the power-wheel 64, whereby the flat or packing face 13' of the plunger 13 will be elevated to the position indicated by the dotted line $a$, Fig. 3, so that the mass within the chute 9 may pass through the supply-orifice or inlet-opening 14 and from thence into the plunger-casing 12, gravitating therefrom into the charge-containing receptacle 17, which had been previously placed in proper position.

When the plunger has reached the dotted-line position $a$, (illustrated in Fig. 3,) the eccentric 75 will have reached the limit of its upstroke, the sleeve 66 having made a partial rotation. On the continued rotation of said sleeve with the shaft 50 the plunger 13 of course will be driven or forced downward until it reaches the mass within the receptacle 17 and will force or compress the mass until it reaches the position indicated by the dotted line $b$, which is the limit of its downstroke, the sleeve at this time having made nearly a complete rotation, and said sleeve continuing its rotation the plunger 13 will be elevated to the position illustrated by the full lines in Fig. 3, (its normal position,) at which time the loose sleeve 66 will be uncoupled from the supporting-shaft 50.

The sleeve 66, which constitutes a part of the plunger-actuating mechanism, will be intermittently coupled to the shaft 50 by means comprehending a coupling device or clutch, said means being governed or operated alternately by the weighing mechanisms.

The sleeve 66 is encircled or embraced by the short band or collar 80, which is rotative or rigid therewith and between lugs or ears on the inside face of which is pivoted the spring-pressed or spring-actuated dog 81, against which the coiled protractile spring 82, (see dotted lines, Fig. 7,) which is seated in a suitable socket or recess in the sleeve 80, is adapted to bear, the tendency of said spring being to force the dog 81 outward and consequently across the plane of movement of a projection or protuberance 83 on the inner or adjacent face of the power-wheel 64.

It will be understood that the sleeve 80 and its pivoted dog 81 constitute one member of a clutch, the complemental or coacting member being the projection 83 on the pulley 64.

The dog 81 will be maintained in its normal or ineffective position by a suitable detent or restraining device, such as the lever 85, which is pivotally connected to a lateral extension of the yoke 52, said lever normally engaging the free end of the dog 81, as indicated best in Fig. 8.

It will be evident that when the lever 85 is raised sufficiently far to be disengaged from the dog 81 the latter will be instantly forced outward by the spring 82 and across the plane of rotation of the projection 83, so that said projection, on the rotation of the wheel or pulley 64, will engage the dog 81, thereby rotating the band 80, and consequently the sleeve 66, for obtaining the hereinbefore-described result.

It is essential that the sleeve 66 and its encircling band or collar 80 should simply make but a single rotation, such operation being obtained by the engagement of the dog 81 and the projection 83, as has been described. On the disengagement of these two parts the rotation of the band and sleeve and their coöperating connected parts will be stopped. The detent-lever 85 is furnished with a cam-face 86, the utility of which will now be set forth.

When the lever 85 has been elevated and the dog 81 released, as shown in Fig. 5, it will immediately tend to descend or resume its normal position, and when the sleeve 66 has made a complete rotation or turn the dog 81 or a roll 87, which is connected to and forms a part thereof, will be met by the interposed cam-face 86, so that as said parts continue their rotation the dog 81 will be returned to its normal position, and when a complete rotation has been made said dog will have been withdrawn wholly from contact with the coacting projection 83 and will come against the stop or abutment 87', the latter being preferably provided with a suitable cushioning device, which instantly arrests the rotation of said dog and consequently its connected parts, such as the sleeve 66, eccentric 75 thereon, and the plunger 13.

It will be obvious from the foregoing that my present invention comprehends the provision of means for holding the plunger in its normal or valve-acting position, the lever 85 constituting such means, it being operable through intermediate connections to hold the plunger 13 when it reaches a point opposite the inlet-openings 14 and 14'.

A relatively long rod is shown at 88 pivoted to the lever 85 and connected by the guide or link 89 to a fixed arm on the base 8', the free end of said rod being bifurcated, the two branches 88' and 88" resting on the two levers 90 and 91, which are pivoted, respectively, to the bases 8 and 8'.

For effecting an upward thrust of the rod 88, to thereby elevate the connected lever 85 for effecting the release of the dog 81, I prefer to employ spring-actuated devices, which will now be described.

A chambered or bored enlargement or casing is shown at 92 preferably cast integral with the shelf or platform 7, its respective bores being designated by 93 and 94, a pair of plunger-rods 95 and 96 being reciprocative in said bores, said rods each being furnished with the collars 97 and 98, against which are adapted to bear the coiled springs 99 and 100, the tendency of which is to force the levers 90 and 91 and hence the rod 88 upward, said springs, however, being normally held under compression by suitable detent means, such as the counterweighted latches or triggers 101 and 101', which are mounted on fixed arms on the bases 8 and 8'. Said latches or triggers will be provided with suitable hooks for engaging coöperating shoulders on the two levers 90 and 91, as indicated in Fig. 1, said latches being also alternately tripped, whereby the rod 88 may be alternately thrust upward through the agency of one or the other of the coiled springs 99 and 100.

The devices for alternately actuating the two triggers 101 and 101' are operated by the two closers L and L', respectively, and they consist of the counterweighted levers 102 and 102', fulcrumed or pivoted to the two posts 103 and 103', which rise from the two bases 8 and 8', the non-counterweighted arms of said levers being normally in engagement with the free arms of the two triggers 101 and 101'.

The counterweighted closer-plates 15 and 15' have the projections or studs 104 and 104' extending laterally therefrom, which on one of the strokes of said closers are adapted to alternately impinge against coöperating projections, such as the by-pass projections 105 and 105' on the two levers 102 and 102', whereby said levers will be oscillated or rocked about their respective axes. When said levers are thus operated, they alternately impart blows to the two triggers 101 and 101', whereby the hooks of the latter will be disengaged from the shoulders on the two levers 90 and 91.

If the trigger 101 be tripped, the lever 90 will be immediately released, and the coiled spring 99, which had theretofore been held under compression, will be also released, and when this action takes place the rod 88, which bears against or rests on the lever 90, will be instantly thrust upward, the detent-lever 85, which is connected to said rod, being elevated or raised clear of the spring-actuated dog 82, which frees the latter for effecting the hereinbefore-specified results.

The projections 105 and 105' on the two levers are preferably by-pass projections, so that on one of the strokes of the two closers L and L' the coöperating projections or studs 104 and 104' will pass by the same, but on the return stroke of said closers, when said by-pass projections are engaged by the coöperating projections, the former will be properly held against movement, so that the two levers 102 and 102' will be actuated.

The by-pass projections 105 and 105' consists of two plates pivoted to the two levers 102 and 102', and they have lugs which engage the under surfaces of their respective supporting-levers.

The closer L is illustrated in Fig. 2 as being in its normal or shut position. Let it be assumed that the latch 21 has been tripped. When this action takes place, said closer will be immediately forced open by the weight of the load or contents within the bucket G, the counterweighted plate 15 being swung upward, and in so doing its projection 104 will strike the by-pass 105 and simply rock the same about its center, the plate 15 continuing its movement until it has reached a position somewhat above the by-pass projection.

In Fig. 5, wherein the closer L is illustrated open and in the act of resuming its normal position, the counterweighted plate 15 is swinging downward, the projection 104 being in contact with the by-pass projection 105, which at this time is held against movement, so that on the continuation of the closer movement the lever 102 will be oscillated, and the projection 104 will ride off the inclined or cam face of the by-pass, at which time the various parts will have reached their normal positions. When the lever 102 is thus operated, the trigger 101 will be tripped thereby to start the various parts in motion or throw them into action.

For resetting or compressing the two coiled springs 99 and 100, and for also resetting the plunger-rods 95 and 96, the rod 88, and the various parts governed thereby, I prefer to employ means operative with or controlled by the plunger-driving or actuating mechanism, and which will now be described. The band or collar 80 on the sleeve 66 has the preferably integral eccentric 106, which is embraced by the ring 107, the latter being furnished with the pitman 108, connected by a suitable slide-joint to the thrust-rod 88. The pitman 108 is furnished with the projecting headed pin or bolt 109 at its lower end, which passes through an elongated loop 110 on said rod.

In Fig. 5 the eccentric 106 is illustrated as being in its normal position, the rod 88 having been thrust upward for elevating or raising the detent-lever 85 to release the spring-dog 82, whereby it may be thrown laterally outward and into the path of the projection 83 on the rotating pulley 64, whereby when these two are in engagement the band or collar 80 will be rotated, as previously described. When the rod 88 has reached the limit of its upstroke, the lower short wall of the longitudinal slot 112 will abut against the pin or bolt 109, as shown in said Fig. 5, the dog 81 at about this time having been released for effecting the rotation of the band or collar 80, and it will be evident that the eccentric 106 will be also rotated and in a direction coinciding with the pulley 64, whereby the rod 88 will be forced downward, thereby compressing one or the other of the two coiled springs, and when the rod 88 has reached the end of its downstroke, as illustrated in Fig. 2, one or the other of the trigger-catches will engage the projections of the two levers 90 and 91. During this described operation the eccentric will have made but a partial turn. Continuing its rotary movement the pin or bolt 109 will be raised until it comes against the upper short wall of the longitudinal slot 112, at which time the spring-dog 82 will have been wholly disengaged from the projection or lug 83 on the driving-wheel or pulley 64.

The operation of the hereinbefore-described apparatus, briefly, is as follows: In Figs. 1, 2, 3, 7, and 8 the various parts are illustrated as occupying their normal positions, and in the three first-mentioned views a box or carton 17 is shown disposed within the gage or setting plate 18 on the platen 4, the plunger 13 (see Fig. 3) being in its middle or intermediate position, it closing the inlet-openings 14 and 14', which communicate with the two chutes 9 and 10, leading from the weighing mechanisms W and W', respectively. In Figs. 2 and 3 the bucket G has nearly completed its load, the other bucket G' being empty. When the load in the bucket G has been fully completed, the tripper 60 on the dropping of the bucket G and beam B will engage the pin 63 on the latch 21, thereby depressing said latch and freeing it from the shoulder on the rocker 19, whereby the closer L will be released, following which said closer is instantly forced open by the weight of the bucket-load, the latter being discharged into the chute 9 and gravitating against the plunger 13. As the closer L opens the counterweighted plate 15 will be oppositely swung, its projection meeting the by-pass projection 105 and rocking it ineffectively about its pivot, the closer at this stage having reached its wide-open position and the projection 104 being above the by-pass projection, as indicated in Fig. 5. When the load has been discharged by the bucket G, the closer L will be returned to its shut position by the counterweighted plate 15, and the projection 104 of the latter will abut against the by-pass 105 on the lever 102, thereby oscillating said lever, so that it will impart a blow to the trigger 101, the hook of said trigger being thereby disengaged from the shoulder on the lever 90, which releases the spring-plunger 95, the latter, by the force of its spring 99, being instantly thrust upward, and the rod 88, through the agency of the intermediate lever 90, being moved in a corresponding direction, so that the lever 85 will be elevated or raised clear of the spring-dog 82 on the band or collar 80. When said dog is released, it is immediately thrown outward and into the path of rotation of the lug or protuberance 83 on the pulley 64, so that on the rotation of said pulley the dog 82, the band or collar 80, and consequently the sleeve 66 will be also rotated. As said sleeve is rotated the eccentric 75 will move in correspondence therewith, its initial act being to elevate or raise the plunger 13 through the interposed pitman 77 until the lower flat face of said plunger reaches the position indicated by the dotted line $a$, Fig. 3, at which time the load of material in the chute 9 may pass through the inlet-opening 14, through the plunger-casing 12, and from thence into the receptacle 17. The plunger 13 will be then depressed until its flat face reaches the limit of its down movement and against the mass within the box 17, thereby packing or compressing the material into said box, following which the plunger will be elevated until it reaches its normal position, as illustrated in Fig. 3, the dog 82 at this point having been disengaged from the projection 83 by the riding of the roll 87 along the cam-face 86 of the detent-lever 85, thereby stopping the plunger and other parts.

Having described my invention, I claim—

1. The combination, with a support for a receptacle, of a casing having an inlet-opening; a plunger reciprocative in said casing; mechanism for reciprocating said plunger; and means independent of the plunger-reciprocating mechanism for stopping the plunger when it is opposite said inlet-opening, and for positively holding it in such position whereby it acts as a valve to cover said opening and prevent the entrance of material to said casing.

2. The combination, with a support for a receptacle, of a casing having an inlet-opening; a chute leading to said inlet-opening; means for delivering charges of material to said chute; a plunger situated in the casing; driving mechanism for the plunger; and means independent of the plunger-driving mechanism for stopping the plunger when it is opposite said inlet-opening, and for positively holding the plunger in such position whereby it acts as a valve to cover said opening and prevent the entrance of material to said casing.

3. The combination, with a support for a receptacle, of a casing having an inlet-opening; weighing mechanism embodying a load-receiver, a chute leading from the weighing mechanism to the inlet-opening; means for effecting the discharge of said load-receiver; a plunger reciprocative in said casing; and means independent of the plunger and reciprocating mechanism for stopping the plunger when it is opposite the inlet-opening, and for positively holding the plunger in such position whereby it acts as a valve to cover said opening and prevent the entrance of material to said casing.

4. The combination, with a support for a receptacle, of a casing having an inlet-opening; a chute leading to said opening; weighing mechanism embodying a load-receiver; a plunger reciprocative within said casing; plunger-reciprocating mechanism; instrumentalities controlled by the plunger-reciprocating means for effecting the discharge of said load-receiver; and means independent of the plunger-driving mechanism for stopping the plunger when it is opposite said inlet-opening, and for positively holding the plunger in such position whereby it acts as a valve to cover said inlet-opening and prevent the entrance of material to said casing.

5. The combination, with a support for a receptacle, of a casing having an inlet-opening; a plunger reciprocative in said casing; a pair of weighing mechanisms comprehending a load-receiver; means for alternately effecting the discharge of said load-receivers for conducting the charges to the casing; mechanism for reciprocating the plunger; and means independent of the plunger-reciprocating mechanism for stopping the plunger when it is opposite said inlet-opening, and for positively holding the plunger in such position whereby it acts as a valve to cover said opening and prevent the entrance of material to said casing.

6. The combination, with a support for a receptacle, of a casing having inlet-openings in its opposite sides; a plunger reciprocative in said casing; a pair of weighing mechanisms each embodying a load-receiver; chutes leading from the weighing mechanisms to said inlet-openings; plunger-reciprocating mechanism; instrumentalities operative with the plunger-reciprocating mechanism for effecting the alternate discharge of said load-receivers; and means independent of the plunger-reciprocating mechanism for stopping the plunger when it is opposite said inlet-openings, and for positively holding the plunger in such position whereby it acts as a valve to cover said opening and prevent the entrance of material to said casing.

7. The combination, with a support for a receptacle, of a plunger and its casing, the latter having an inlet-opening; a supply-chute leading to said inlet-opening; rotary driving mechanism for reciprocating said plunger; and means for throwing the plunger into and out of connection with its driving mechanism when the latter has made a single rotation, and for holding the plunger at a point opposite said inlet-opening when said plunger has been stopped.

8. The combination, with a support for a receptacle, of a casing having inlet-openings; a plunger situated within said casing; a pair of weighing mechanisms; chutes leading from said weighing mechanisms to the inlet-openings; load-discharge-controlling means for each of the weighing mechanisms, each embodying a latch; trippers, one for each of said latches; plunger-driving mechanism; and shifting means controlled by the plunger-driving mechanism, for alternately throwing said trippers into their operative and inoperative positions, respectively, whereby the simultaneous discharge of the two weighing mechanisms is prevented.

9. The combination, with a support for a receptacle, of a casing having inlet-openings; a pair of weighing mechanisms; chutes leading from the weighing mechanisms to said inlet-openings; a plunger situated within said casing; a shaft and its driving mechanism; differential gears, one of which is mounted on said shaft; means for intermittently coupling one of the gears to the shaft and for uncoupling it therefrom when it has made a complete rotation; load-discharge-controlling means for the weighing mechanisms, each embodying a latch; connected trippers, one for each of the latches; and a connection between one of the trippers and one of the gears.

10. The combination with a pair of weighing mechanisms, each of which comprehends a load-receiver; of load-discharge-controlling means for each of said load-receivers, each embodying a latch; trippers, one for each of said latches; and shifting means for alternately throwing said trippers into their operative and inoperative positions, respectively.

11. The combination with a pair of weighing mechanisms, each of which comprehends a load-receiver; of load-discharge-controlling means for each of said load-receivers, each embodying a latch; trippers, one for each of said latches; and shifting means for simultaneously throwing said trippers into their operative and inoperative positions, respectively.

12. The combination with weighing mechanism comprehending a load-receiver, of load-discharge-controlling means embodying a latch; a tripper for said latch; a shaft having a gear; a meshing gear operatively connected to said tripper; and means for intermittently coupling said first-mentioned gear to its shaft.

13. The combination with weighing mechanism embodying a load-receiver, of load-discharge-controlling means including a latch; a tripper for said latch; a shaft having a pinion thereon; a meshing gear operatively connected to said tripper, the ratio of efficiency of said pinion and gear being as one to two; and means for intermittently coupling said pinion to its shaft.

14. The combination with a pair of weighing mechanisms, each of which comprises a load-receiver; of load-discharge-controlling means for each of said load-receivers, each embodying a latch; trippers, one for each of said latches; a direct connection between said trippers and extending beyond one of them; an angle-lever attached to said direct connection; a shaft carrying a pinion; a meshing gear operatively connected to said angle-lever; and means for intermittently coupling said pinion to its shaft.

15. The combination with a support for a receptacle, of a casing having an inlet-opening; a plunger, reciprocative within said casing and normally acting as a valve to close the inlet-opening and prevent the entrance of material to said casing; a chute leading to said inlet-opening; weighing mechanism comprehending a load-receiver; load-discharge-controlling means for said load-receiver, including a latch; a tripper for said latch; means for alternately throwing said latch-tripper into its operative and inoperative positions, respectively; and mechanism for elevating said plunger to uncover the inlet-opening and for also depressing said plunger.

16. The combination with a support for a receptacle, of a casing having an inlet-opening; a packing device operative within said casing; weighing mechanism including a load-receiver; load-discharging instrumentalities; actuating mechanism for said packing device; and means controlled by the weighing mechanism, for throwing the actuating mechanism for the packing device into and out of action.

17. The combination with a support for a receptacle, of a casing; weighing mechanism embodying a load-receiver; load-discharging instrumentalities; a chute leading from the weighing mechanism to the casing; a packing device operative in said casing; actuating mechanism for said packing device, including a shaft and a loose sleeve thereon; and means controlled by the weighing mechanism, for intermittently coupling said sleeve to its shaft.

18. The combination with a support for a receptacle, of a casing; weighing mechanism embodying a load-receiver; load-discharging instrumentalities; a chute leading from the weighing mechanism to the casing; a packing device reciprocative within said casing; actuating mechanism for said packing device, including a shaft and a loose sleeve thereon, said sleeve being provided with an eccentric connected by a rod to said packing device; and means controlled by the weighing mechanism, for intermittently coupling said sleeve to its shaft.

19. The combination with a support for a receptacle, of a casing; weighing mechanism embodying a load-receiver; load-discharging instrumentalities; a chute leading from the weighing mechanism to the casing; a packing device operative in said casing; a shaft carrying a pulley provided with a projection; a loose sleeve on said shaft, operatively connected to said packing device and carrying a dog; and means for throwing said dog across the plane of rotation of said projection.

20. The combination with a support for a receptacle, of a casing; weighing mechanism embodying a load-receiver; load-discharging instrumentalities; a chute leading from the weighing mechanism to the casing; a packing device operative in said casing; a shaft carrying a pulley provided with a projection; a loose sleeve on said shaft, operatively connected to said packing device and carrying a spring-actuated dog; a detent device for normally holding said dog against movement; and means for intermittently releasing said dog, whereby it will be thrown across the plane of rotation of said projection by the force of its actuating-spring.

21. The combination with a support for a receptacle, of a casing; weighing mechanism embodying a load-receiver; load-discharging instrumentalities; a chute leading from the weighing mechanism to the casing; a packing device operative in said casing; a shaft carrying a pulley provided with a projection; a loose sleeve on said shaft operatively connected to said packing device and carrying a spring-actuated dog; a lever adapted for engaging said dog; and a rod attached to said lever and adapted to receive a dog-releasing thrust from means controlled by the weighing mechanism.

22. The combination with a support for a receptacle, of a casing; weighing mechanism embodying a load-receiver; load-discharging instrumentalities; a chute leading from the weighing mechanism to the casing; a packing device operative in said casing; a shaft carrying a pulley provided with a projection; a loose sleeve on said shaft, operatively connected to said packing device and carrying a spring-actuated dog; an intermittently-reciprocative lever having a cam-face, the lever being adapted to maintain the dog in its normal position; and means for reciprocating said lever, whereby the dog will be released on one of its strokes and whereby the cam-face thereof will be interposed in the path of movement of said dog to return the latter to its normal position.

23. The combination with a support for a receptacle, of a casing; weighing mechanism embodying a load-receiver; load-discharging instrumentalities; a chute leading from the weighing mechanism to the casing; a packing device operative in said casing; a shaft carrying a pulley provided with a projection; a loose sleeve on said shaft, operatively connected to said packing device and carrying a spring-actuated dog; an intermittently-reciprocative lever having a cam-face and an adjacent stop, said lever being adapted to maintain the dog in its normal position; and means for reciprocating said lever, whereby the dog will be released on one of its strokes and whereby the cam-face thereof will be interposed in the path of movement of said dog to return the latter to its normal position, said dog, when it has made a complete turn, being adapted to abut against said stop.

24. The combination with a support for a receptacle, of a casing; weighing mechanism embodying a load-receiver; load-discharge-controlling mechanism including a latch; a tripper for said latch; a chute leading from the weighing mechanism to the casing; a packing device operative in said casing; actuating mechanism for said packing device, including a shaft and a loose sleeve thereon; means controlled by the weighing mechanism, for intermittently coupling said sleeve to its shaft; and a pair of meshing gears one of which is fast on said sleeve, the other being operatively connected to said latch-tripper.

25. The combination with a support for a receptacle, of a casing; a packing device operative in said casing; weighing mechanism including a load-receiver; load-discharging instrumentalities; a shaft carrying a pulley having a projection; a sleeve on said shaft; a band on said sleeve having a dog normally held against movement by a detent device; a rod connected to said detent device; an eccentric on said band, having a rod operatively connected to said first-mentioned rod by a slide-joint; and means carried by said shaft, for actuating said packing device.

26. The combination with a support for a receptacle, of a casing; a packing device located in said casing; weighing mechanism including a load-receiver; load-discharging instrumentalities; a shaft having a pulley provided with a projection; a sleeve loose on said shaft and carrying a spring-actuated dog; a lever normally holding said dog against movement; a rod connected to said lever; a second lever on which said rod is adapted to rest; a spring-plunger for operating said second lever; and a trigger for normally holding said second lever against movement and thereby the spring-plunger against effective action.

27. The combination with a support for a receptacle, of a casing; a packing device located in said casing; a shaft having a pulley provided with a projection; a sleeve loose on said shaft and carrying a spring-actuated dog; a lever normally holding said dog against movement; a rod connected to said lever; a second lever on which said rod is adapted to rest; a spring-plunger for operating said second lever; and a trigger for normally holding said second lever against movement and thereby the spring-plunger against effective action.

28. The combination with a support for a receptacle, of a casing; a packing device located in said casing; weighing mechanism embodying a closer; instrumentalities including a latch for normally holding said closer against movement; a shaft having a pulley provided with a projection; a sleeve loose on said shaft and carrying a spring-actuated dog; a lever normally holding said dog against movement; a rod connected to said lever; a second lever on which said rod is adapted to rest; a spring-plunger for operating said second lever; a trigger for normally holding said second lever against movement and thereby the spring-plunger against effective action; and means operated by such closer for tripping said plunger.

29. The combination with a support for a receptacle, of a casing; a packing device located in said casing; weighing mechanism embodying a closer; instrumentalities including a latch, for normally holding said closer against movement; a shaft having a pulley provided with a projection; a sleeve loose on said shaft and carrying a spring-actuated dog; a lever normally holding said dog against movement; a rod connected to said lever; a second lever on which said rod is adapted to rest; a spring-plunger for operating said second lever; a trigger for normally holding said second lever against movement and thereby the spring-plunger against effective action; and a device located between the closer and said second lever and adapted to be operated by the closer, said device being also adapted to trip said trigger.

30. The combination with a pair of weighing mechanisms, each embodying a load-receiver; of load-discharge-controlling means for each of said weighing mechanisms; each embodying a latch; cam-levers constituting trippers for said latches; and means for throwing said cam-levers alternately into their operative and inoperative positions.

FRANCIS H. RICHARDS.

Witnesses:
FRED. J. DOLE,
BENTON N. PARKER.